United States Patent [19]

Mizukami

[11] Patent Number: 4,733,081

[45] Date of Patent: Mar. 22, 1988

[54] METHOD AND APPARATUS FOR SENSING A HUMAN BODY

[75] Inventor: Yoshio Mizukami, Kurobe, Japan

[73] Assignee: Yoshida Kogyo K. K., Tokyo, Japan

[21] Appl. No.: 873,508

[22] Filed: Jun. 12, 1986

[30] Foreign Application Priority Data

Jun. 12, 1985 [JP] Japan .............................. 60-126348
Dec. 28, 1985 [JP] Japan .............................. 60-202953[U]

[51] Int. Cl.[4] .............................. G01J 5/10; G05F 15/20

[52] U.S. Cl. .............................. 250/341; 250/221; 49/25; 340/556

[58] Field of Search .............................. 250/221, 341; 340/555, 340/556; 49/25

[56] References Cited

U.S. PATENT DOCUMENTS

| | | | |
|---|---|---|---|
| 3,597,755 | 8/1971 | Parkin | 340/555 |
| 3,680,047 | 7/1972 | Perlman | 250/221 |
| 4,068,222 | 1/1978 | Treviranus | 250/221 |
| 4,207,466 | 6/1980 | Drage et al. | 250/341 |

FOREIGN PATENT DOCUMENTS

| | | | |
|---|---|---|---|
| 60970 | 6/1974 | Japan . | |
| 84178 | 5/1984 | Japan | 250/341 |

*Primary Examiner*—Carolyn E. Fields
*Attorney, Agent, or Firm*—Hill, Van Santen, Steadman & Simpson

[57] ABSTRACT

A method for sensing a human body has the steps of projecting infra-red rays from a projector, receiving infra-red rays reflected from a background and a human body by a photo-sensor, deriving a difference between a reflection amount from the background and that from the human body on the basis of an output from the photo-sensor by the action of first and second integrator circuits, and outputting a human body sense signal from a response circuit when the difference in the reflection amount is held at a predetermined period of time. The first integrator circuit has a relatively small time constant, while the second integrator circuit has a relatively large time constant.

4 Claims, 5 Drawing Figures

METHOD AND APPARATUS FOR SENSING A HUMAN BODY

BACKGROUND OF THE INVENTION

1. Field of the Invention

The present invention relates to a method and an apparatus for sensing a human body that is available, for instance, in an automatic door or the like.

2. Description of the Prior Art

In an automatic door, approach of a human body to the door is sensed, and in response to the sensing of a human body a door opening/closing signal is generated to actuate the door to open and close, and to that end, as a method and an apparatus for sensing a human body, various kinds of methods and apparatus have been known in the prior art.

For example, a method and an apparatus for sensing a human body, in which a projector for projecting infra-red rays and a photo-sensor adapted to receive infra-red rays reflected by a floor surface and a human body are provided and the photosensor generates a sense signal when it senses variation of the amount of reflection of infra-red rays, have been known.

However, these heretofore known methods and apparatus had the following shortcomings:

(1) If rays of sunlight should momentarily enter the photo-sensor as reflected by any moving body, then a sense signal would be incorrectly generated, and hence sometimes, a door may malfunction.

(2) If the infra-red rays projected from the projector should momentarily enter the photo-sensor as reflected by falling snow, then a sense signal would be incorrectly generated, and hence sometimes, a door may malfunction.

(3) Under the condition where a human body stands still, it cannot be sensed.

More particularly, since the amount of reflection from a floor surface of the irradiated infra-red rays would change according to variation in time of a radiation efficiency of the projector and according to variation of the floor surface condition, in the event that a level of the amount of reflection of the infra-red rays is simply used for determination of sensing of a human body, minute variation in time of the level itself of the amount of reflection would be caused by the above-mentioned variation of the amount of reflection, hence it is necessary to inhibit sensing of that variation, consequently a level difference of a minute amount of reflection becomes hard to be senced, and so a sensing distance cannot be chosen long.

In order to resolve this problem, a method in which the amount of variation of the reflection amount is sensed rather than the reflection amount itself and a sense signal is provided depending upon the amount of variation, that is, a method of differential operation type, may be employed, but if such type of method is employed, in the case where a human body stands still, the human body cannot be sensed because the reflection amount does not vary.

SUMMARY OF THE INVENTION

It is therefore one object of the present invention to provide a method for sensing a human body, in which not only malfunction would not be caused by variation of a condition of a background nor by variation in time of a radiation efficiency of a projector, but also malfunction would not be caused by incidence of infra-red rays reflected by falling snow and/or rays of sunlight reflected by any moving body, and yet a human body standing still can be sensed.

Another object of the present invention is to provide an apparatus for practicing the above-described method for sensing a human body.

Still another object of the present invention is to provide an apparatus for practicing the above-described method for sensing a human body, which apparatus can attain its stationary state within a short period of time under a transient operating condition such as when a power source has been switched ON or when an orientation of a projector and/or a photo-sensor has been changed.

According to one feature of the present invention, there is provided a method for sensing a human body consisting of the steps of projecting infra-red rays from a projector, receiving infra-red rays reflected from a background and a human body by a photo-sensor, deriving a difference between a reflection amount from the background and a reflection amount from the human body on the basis of an output from the photo-sensor, and outputting a human body sense signal when the difference in the reflection amount is held at a predetermined level or higher consecutively for a predetermined period of time.

According to another feature of the present invention, there is provided an apparatus for sensing a human body, comprising a projector for projecting infra-red rays towards a human body sensing region, a photo-sensor for receiving infra-red rays reflected from the human body sensing region and outputting an electric signal corresponding to an intensity of incident infra-red rays, a first integrator circuit connected to the output side of the photo-sensor and having a relatively small time constant, a second integrator circuit connected to the output side of the photo-sensor and having a relatively large time constant, and a response circuit connected to the outputs of the first integrator circuit and the second integrator circuit for outputting a human body sense signal when the difference between the respective outputs is held at a predetermined level or higher consecutively for a predetermined period of time.

According to still another feature of the present invention, there is provided the last-featured apparatus for sensing a human body, in which the second integrator circuit includes means for shortening a time constant of the circuit for a predetermined period of time when a power source has been switched ON or a push-button switch has been actuated, and means for elongating the time constant of the circuit during the period when the human body sense signal is output from the response circuit.

According to yet another feature of the present invention, there is provided the last-featured apparatus for sensing a human body, in which the second integrator circuit has a substantially infinite time constant when the time constant of the circuit has been elongated.

According to the present invention, owing to the above-mentioned features of the invention, not only malfunction would not be caused by change of the condition of the background and change in time of a radiation efficiency of the projector, but also malfunction would not be caused by incidence of infra-red rays reflected by falling snow or rays of sunlight reflected by any moving body, and moreover, even a human body standing still can be sensed. In addition, even under a transient operating condition such as when a power source has been switched ON or when an orientation of a projector and/or a photo-sensor has been changed, the second integrator circuit would have its time constant shortened automatically or by actuating a push-button switch, and so, the circuit can attain its stationary state within a short period of time.

DETAILED DESCRIPTION OF THE PREFERRED EMBODIMENTS

Figure 4:
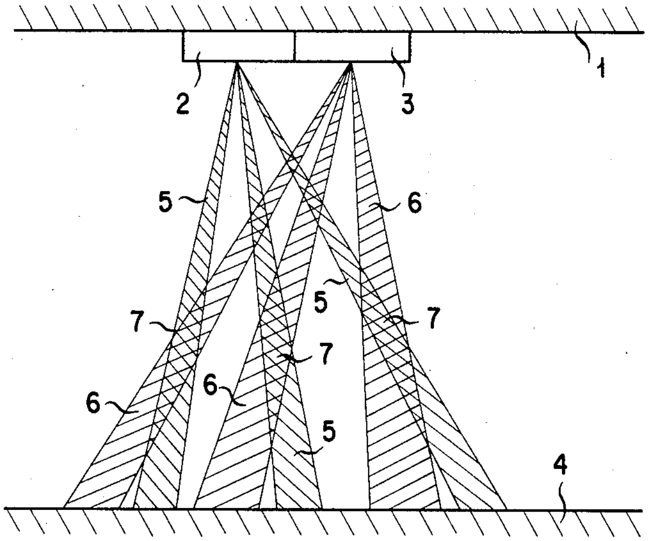
FIG. 4 is a schematic view showing a mode of mounting a projector and photo-sensor as well as a human body sensing region.

FIG. 4 shows schematically a mode of mounting a projector and a photo-sensor, in which a projector 2 and a photo-sensor 3 are disposed on a ceiling 1, infra-red rays are projected towards a floor 4 as indicated by irradiation regions (single-hatched regions) 5, and a intersecting portions between photo-sensing regions (inversely single-hatched regions) 6 and the irradiation regions 5 form human body sensing regions (double-hatched regions) 7.

The projector 2 projects infra-red rays modulated at a predetermined frequency, and the photo-sensor 3 receives infra-red rays reflected by a background or a human body in the human body sensing region 7, converts them into an electric signal and outputs the signal.

Figure 1:
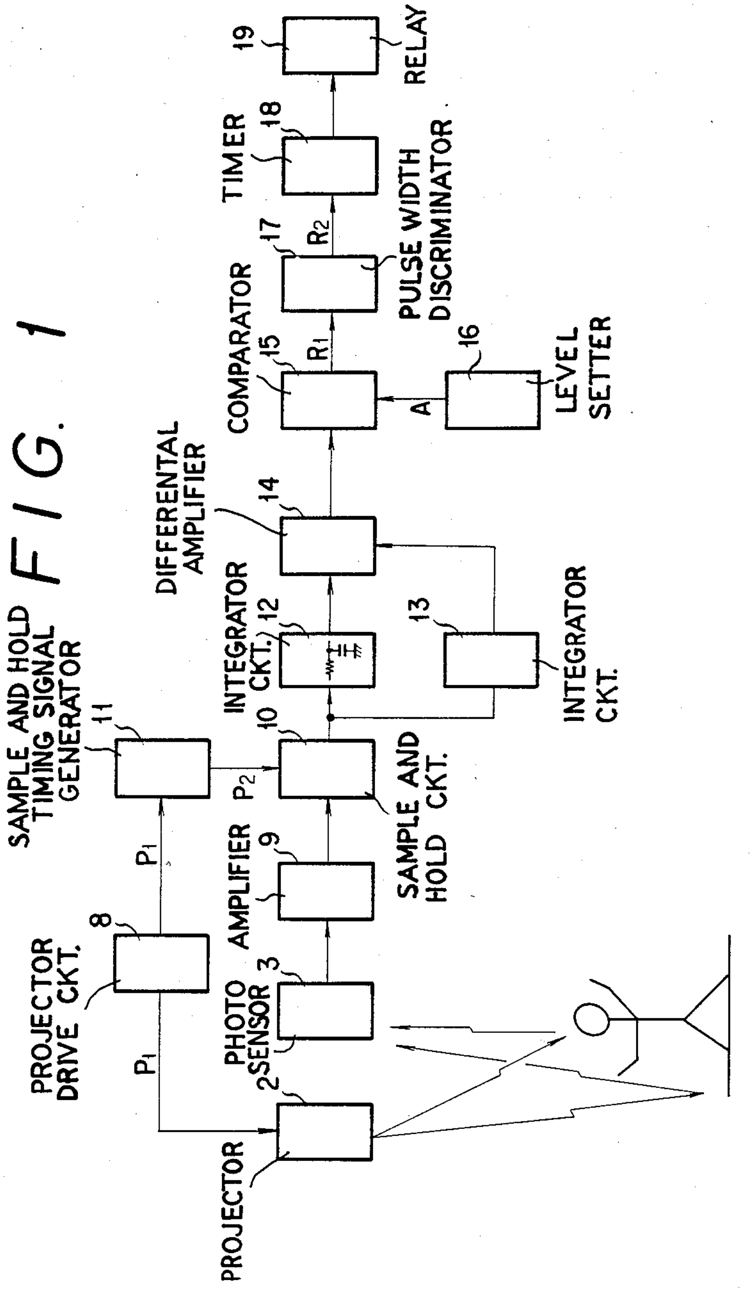
FIG. 1 is a block diagram showing one preferred embodiment of the present invention.
Figure 2:
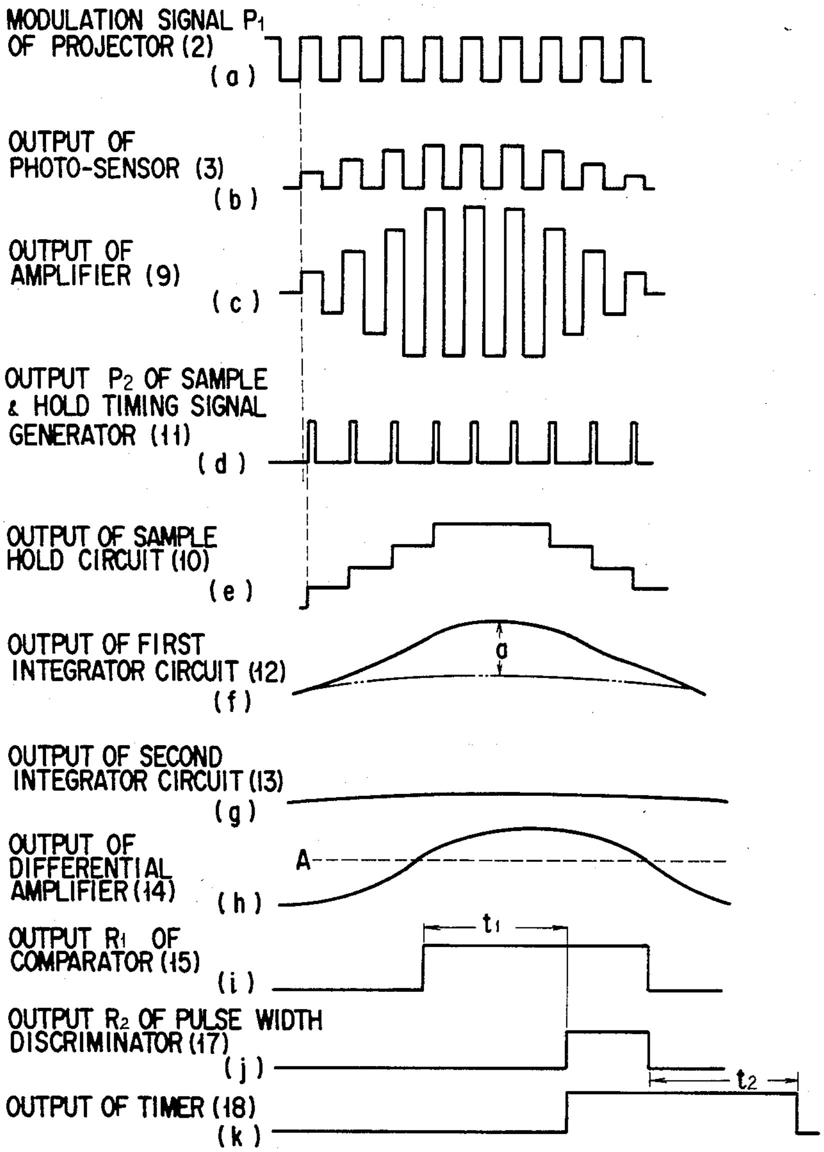
FIG. 2 is a waveform diagram showing signal waveforms appearing at the output of the respective blocks in FIG. 1.

FIG. 1 is a block diagram showing a method for sensing a human body according to the present invention, and signal waveforms appearing at the outputs of the respective blocks in this figure are illustrated in a waveform diagram in FIG. 2. The projector 2 projects infra-red rays modulated by a pulsed projector drive signal $P_1$ (FIG. 2(*a*)) issued from a projector drive circuit 8, the output of the photo-sensor 3 forms a series of pulses which are successively increased and decreased in a pulse height as a result of entrance of a human body as shown in FIG. 2(*b*), the output is amplified with respect to an A.C. component by an amplifier 9 so as to have an output level as shown in FIG. 2(*c*), and the output level is fed to a sample and hold circuit 10, where the output level is held by a timing signal issued from a sample and hold timing signal generator 11.

The above-referred sample and hold timing signal generator outputs a timing signal (pulse)$P_2$ with a certain time delay with respect to the projector drive signal $P_1$ as shown in FIG. 2(*d*), the sample and hold circuit 10 holds the output level of the amplifier 9 at the time point when the above-mentioned timing pulse $P_2$ has been input thereto until the time point when the next timing signal $P_2$ is input thereto, and so, the output signal of this sample and hold circuit 10 is a step-like signal synchronized with the timing of projection of infra-red rays as shown in FIG. 2(*e*).

More particularly, in response to the projector drive signal $P_1$ fed from the projector drive circuit 8, the sample and hold timing signal generator 11 outputs to the sample and hold circuit 10 the timing signal $P_2$ that is necessary for a sample and hold operation synchronized with the timing of projection of infra-red rays from the projector 2, and therefore, each time the projector drive signal $P_1$ is output, the sample and hold circuit 10 holds and outputs the output level of the photo-sensor 3 which has been amplified by the amplifier 9.

The output level of the sample and hold circuit 10 is integrated by a first integrator circuit 12 and a second integrator circuit 13, respectively.

A time constant ([resistance of integrator circuit resistor]×[capacity of integrator circuit capacitor]) of the first integrator circuit 12 is chosen at a relatively small value, hence the variation in time of the output of the first integrator circuit 12 is large as shown in FIG. 2(*f*), so that the reflection amount from both the background and the human body can be simultaneously sensed.

A time constant of the second integrator circuit 13 is chosen at a far larger value than that of the first integrator circuit 12, hence the variation in time of the output of the second integrator circuit 13 is far smaller than that of the first integrator circuit 12 as shown in FIG. 2(*g*), so that even if the output level of the sample and hold circuit 10 becomes large abruptly, the output of the second integrator circuit 13 cannot quickly follow the level variation, and therefore, even in the event that a human body enters the human body sensing region 7, the output of the second integrator circuit 13 would not become large quickly but would hold the background level before the human body enters for a certain period of time. Therefore, the second integrator circuit can be deemed to selectively hold the amount of reflection from the background.

The output levels of the first and second integrator circuits 12 and 13 are fed to a differential amplifier 14, in which a difference a between the respective output levels as shown in FIG. 2(*f*) is amplified to produce an amplified output level difference as shown in FIG. 2(*h*).

Thereby, a difference between the level of the reflection amount from the background and the level of the reflection amount from the human body, that is, a variation of the output level of the photo-sensor 3 when a human body has entered the human body sensing region 7 can be derived and amplified. Therefore, even in the case where the level of the reflection amount from the background has varied as a result of change of the background condition, only the amount of variation of the output level of the photo-sensor 3 can be derived, and the amount of variation can be amplified. That is, since the amount of the original variation of the output level of the photo-sensor 3 is as small as about 0.01 V, it is necessary to amplify the original variation.

The output level of the differential amplifier 14 is applied to a comparator 15, in which the applied output level is compared with a set level value A applied from a level setter 16 as shown in FIG. 2(*h*), and when the output level is equal to or higher than the set level value A, the comparator 15 outputs a signal $R_1$ having a predetermined voltage level as shown in FIG. 2(*i*).

This signal $R_1$ is output to a pulse width discriminator circuit 17, in which the time period when the signal $R_1$ is output is observed, and if the signal $R_1$ is output for a predetermined period $t_1$ or more, then a human body sense signal $R_2$ at a predetermined voltage level is output until the signal $R_1$ ceases (that is, until the output of the comparator 15 is turned OFF) as shown in FIG. 2(*j*).

Here, the predetermined period $t_1$ when the signal $R_1$ is output implies a time period of the order that output of the photo-sensor 3 when infra-red rays reflected by falling snow or rays of sunlight reflected by any moving body have enters the photo-sensor 3 and output of the photo-sensor 3 when infra-red rays reflected by a human body have entered the photo-sensor 3 can be discriminated, and thereby malfunction of the apparatus caused by falling snow or sunlight can be prevented.

More particularly, since the period when infra-red rays reflected by falling snow or rays of sunlight reflected by any moving body enter the photo-sensor 3 is a very short period, the period when the signal $R_1$ is output from the comparator 15 in that case is shorter than the predetermined period $t_1$, and so, the pulse width discriminator circuit 17 does not output the human body sense signal $R_2$ in that case.

The human body sense signal $R_2$ issued from the pulse width discriminator circuit 17 is input to a timer 18, which starts operation of a relay 19 in response to input of the signal $R_2$, and also which stops operation of the relay 19 after a predetermined period of time has elapsed since disappearance of the signal $R_2$, and the relay 19 continues to output a control signal to a controller not shown during its operation.

More particularly, as shown in FIG. 2(*k*), if the human body sense signal $R_2$ is input to the timer 18 from the pulse width discriminator circuit 17, then the timer 18 actuates the relay 19, and even after disappearance of the signal $R_2$ the timer 18 is held ON for a preset time $t_2$ to keep the relay 19 actuated.

As described above, since a difference between a reflection amount from a background and a reflection amount from a human body or the like is detected and a human body sense signal is output only when this difference in a reflection amount has a predetermined value or a higher value and such value continues for a predetermined period or more, in the event that the sustaining period of the difference in the reflection amount having such value is relatively short as in the case where rays of sunlight reflected by any moving body or projected infra-red rays reflected by falling snow enter the photo-sensor, the human body sense signal would not be output, and also in the event that the difference in the reflection amount is small as in the case where variation of a radiation efficiency of a projector or variation of a reflection amount from a floor has occurred, the human body sense signal would not be output. Therefore, the malfunctions as occurred in the heretofore known apparatus would not arise.

In addition, even a human body standing still can be sensed.

However, since the above-described second integrator circuit 13 has a relatively large time constant for the purpose of deriving only a reflection amount from a background, the apparatus involves the following problems.

That is, due to the large time constant, in the event that a reflection amoutn from a background has changed in the case of switching ON a power source or in the case where an orientation of a projector and/or a photo-sensor has been changed, then it takes too much time until an inherent integrated value is recovered in the second integrator circuit.

In the case where a human body continues to stay in the human body sensing region, the integrated value rises gradually, hence the difference between the outputs of the first and second integrator circuit becomes small, and a sensitivity of sensing a human body is lowered.

In the event that a human body which continued to stay has disappeared, it takes much time until the integrated value which rose in the above-described manner returns to the inherent integrated value.

Figure 3:
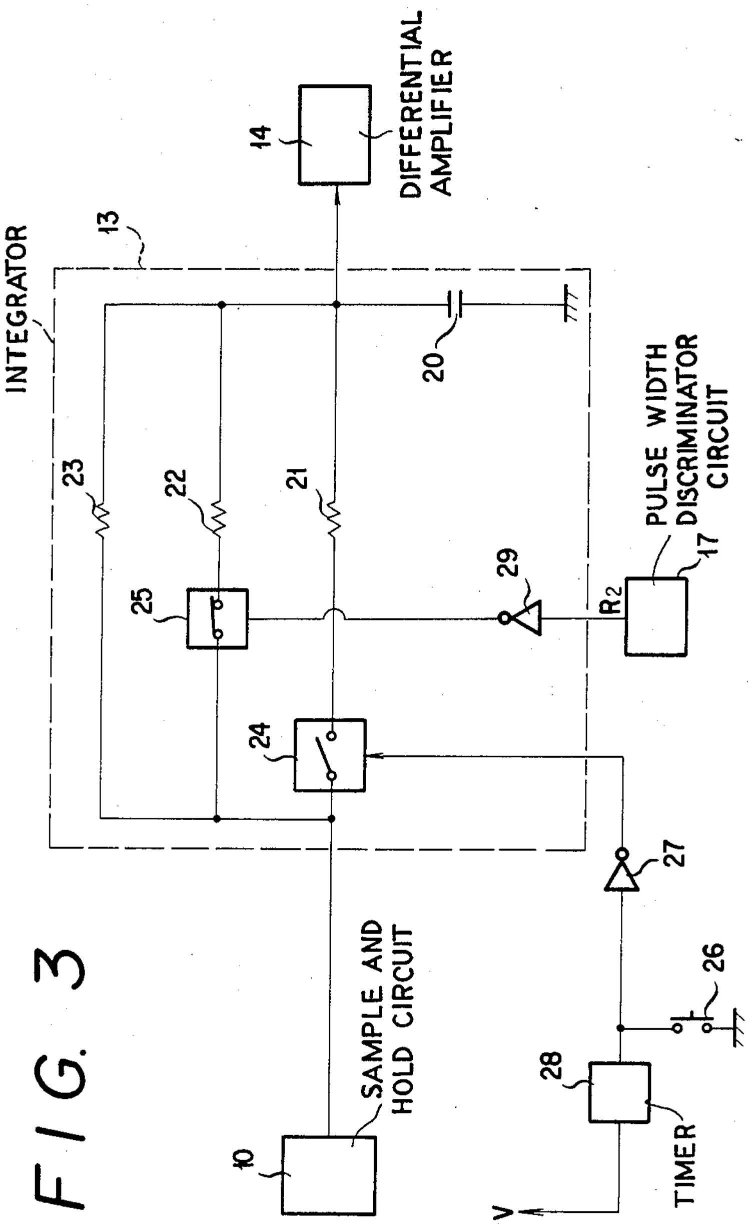
FIG. 3 is a circuit diagram illustrating a circuit construction of a second integrator circuit in FIG. 1, jointly with its peripheral blocks.

Therefore, in the second integrator circuit 13, as shown in FIG. 3, a parallel connection of first, second and third resistors 21, 22 and 23 is connected between an input terminal and an ungrounded terminal of a capacitor 20, a first switch 24 is connected in series in the branch of the first resistor 21, a second switch 25 is connected in series in the branch of the second resistor 22, an actuation circuit of the first switch 24 is connected to a push-button switch 26 via a NOT gate 27 and is also connected to a power source via a timer 28, and an actuation circuit of the second switch 25 is connected to an output of the pulse width discriminator circuit 17 via a NOT gate 29. By making the above-described provision, the first switch 24 is switched ON for a certain period of time (as set by the timer 28) when the power source is switched ON or the push-button switch 26 is depressed, and the second switch 25 is normally ON but is turned OFF when the human body sense signal $R_2$ is output from the pulse width discriminator circuit 17.

Since the second integrator circuit is constructed as described above, during a normal period when the power source is kept switched ON and the push-button switch 26 is held OFF, the first switch is kept OFF because an actuation signal is not input thereto, and the second switch 25 is kept ON because an actuation signal is input thereto due to the fact that the pulse width discriminator circuit 17 does not output the human body sense signal $R_2$.

Accordingly, a parallel connection of the second resistor 22 and the third resistor 23 is connected in series with the capacitor 20, and a time constant $T_2$ of the integrator circuit at this moment is chosen to have a sufficiently large value for carrying out the above-described integrating operation as the second integrator circuit.

Whereas, when the power source has been switched ON or when the push-button switch 26 has been switched ON, since the first switch is kept ON during a certain period set by the timer 28, a parallel connection of the first, second and third resistors 21, 22 and 23 is connected in series with the capacitor 20, and the composite resistance value of these resistors becomes smaller than the resistance of the above-described parallel connection of the second and third resistors 22 and 23. Therefore, a time constant $T_3$ of the second integrator circuit during this period becomes smaller than the time constant $T_2$ during the normal period ($T_2 > T_3$).

Therefore, when the power source has been switched ON or when an orientation of the projector 2 and/or the photo-sensor 3 has been changed, it is possible to make the second integrator circuit take the inherent integrated value within a short period of time by reducing the time constant of the second integrator circuit 13.

In addition, when the human body sense signal $R_2$is output from the pulse width discriminator circuit 17, since the second switch 25 is turned OFF, only the third resistor 23 is connected in series with the capacitor 20, and at that time the resistance of the resistor in series with the capacitor 20 becomes largest. Accordingly, a time constant $T_1$ at this moment is largest ($T_1>T_2>T_3$).

Accordingly, when a human body has entered the human body sensing region 7, the time constant of the second integrator circuit 13 becomes larger than that during a normal period, so that in the event that a human body continues to stay in the human body sensing region 7, the integrated value is prevented from rising so high, and thereby lowering of a sensitivity can be prevented. Also, if the human body that has continued to stay in the human body sensing region 7 disappears, then the human body sense signal $R_2$ becomes not to be output from the pulse width discriminator circuit 17, hence the second switch 25 is turned ON. Thus, since the time constant is reduced from $T_1$ to $T_2$, the integrated value of the second integrator circuit 13 can return to an inherent integrated value within a short period of time.

Therefore, by making use of the second integrator circuit 13 as described above, the human body sensing apparatus shown in FIG. 1 can achieve satisfactory human body sensing operations so long as a human body does not continue to stay too long within a human body sensing region. However, in the case where the above-described second integrator circuit 13 is used in the human body sensing apparatus in FIG. 1, since the largest value $T_1$ of the time constant of the second integrator circuit 13 is a value corresponding to the resistance of the third resistor 23 and the resistance of the third resistor 23 is finite in magnitude, the largest value $T_1$ of the time constant is also a finite value, hence during a normal period if a reflection amount from a human body is consecutively input to the second integrator circuit 13, would continue to rise gradally due to the increment of the reflection amount caused by the human body, and as a result, a sensitivity of the human body sensing apparatus is lowered. In other words, if a human body should continue to stay in the human body sensing region 7 for an extremely long period, then the integrated value in the second integrating circuit 13 would be successively increased and the difference from the integrated value in the first integrator circuit 12 would become small, so that the sensitivity is lowered.

Figure 5:
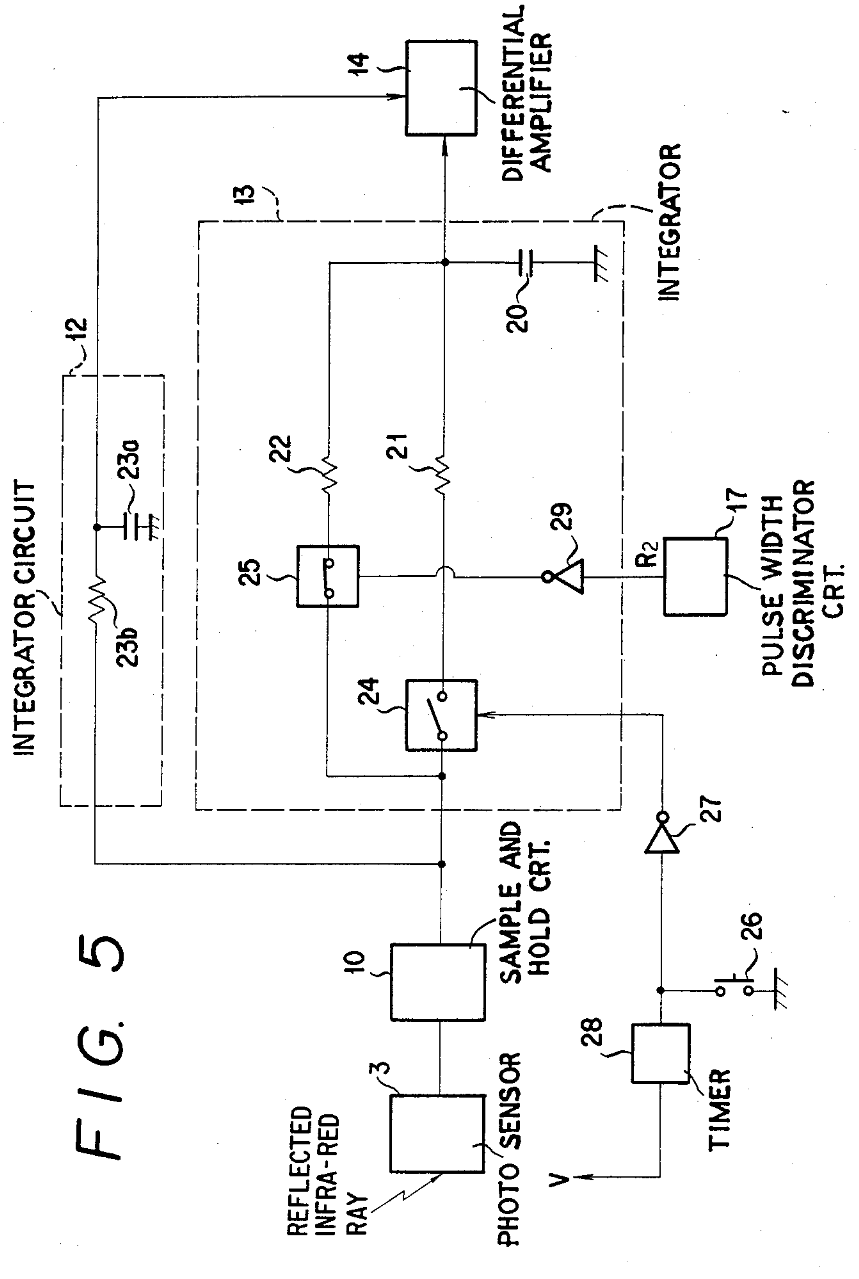
FIG. 5 is a circuit diagram illustrating a modification of the second integrator circuit in FIG. 1, jointly with a circuit construction of a first integrator circuit and other peripheral blocks.

A second preferred embodiment of the second integrator circuit in the apparatus according to the present invention, which has been further improved so that even in the above-mentioned case the lowering of the sensitivity can be minimized, is illustrated in FIG. 5 jointly with its peripheral circuits.

As will be apparent by comparing FIG. 5 with FIG. 3, a difference between the respective second integrator circuits 13 exists only in that in FIG. 5, the third resistor 23 connected between the ungrounded terminal of the capacitor 20 and the input of the integrator, circuit in FIG. 3 is omitted and integrator circuit 12 is provided consisting of a resistor **23*b* and a capacitor 23*a* to ground. With respect to the other points, the constructions of these two second integrator circuits 13 are identical, and so, corresponding component parts are given like reference numerals. Hence, with respect to the circuit construction of the second integrator circuit 13 shown in FIG. 5**, further explanation thereof will be omitted here.

With regard to operations, a difference between these two second integrator circuits 13 resides in the following points:

(1) During a normal period when a power source has been continuously switched ON and the push-button switch 26 is held OFF, in contrast to the fact that in the circuit shown in FIG. 3, a parallel connection of the second and third resistors 22 and 23 is connected in series with the capacitor 20 to form an integrator circuit, and a time constant $T_2$ at that time is determined by the resistances of the second and third resistors 22 and 23 and the capacity of the capacitor 20, in the circuit shown in FIG. 5, during such a normal period the second resistor 22 and the capacitor 20 are connected in series to form an integrator circuit and a time constant $T_2'$ at that time is determined by the resistance of the second resistor 22 and the capacity of the capacitor 20.

(2) During a predetermined period set in the timer 28 after a power source has been switched ON or the push-button switch 26 has been switched ON, in the second integrator circuit shown in FIG. 3 a composite resistance of a parallel connection of the first, second and third resistors 21, 22 and 23 and the capacity of the capacitor 20 determine a time constant $T_3$, whereas in the second integrator circuit shown in FIG. 5, a composite resistance of a parallel connection of the first and second resistors 21 and 22 and the capacity of the capacitor 20 determine a time constant $T_3'$.

(3) During the period when a human body has entered the human body sensing region 7 and the second switch 25 is held OFF by the human body sense signal $R_2$, since the first switch 24 is also held OFF, in the second integrator circuit shown in FIG. 3 a large finite time constant $T_1$ is determined by the large but finite resistance of the third resistor 23 and the capacity of the capacitor 20, whereas in the second integrator circuit shown in FIG. 5, a substantially infinitely large time constant $T_1'$ is determined by a substantially infinitely large resistance corresponding to a leakage resistance between the input terminal of the integrator circuit and the ungrounded terminal of the capacitor 20, and the capacity of the capacitor 20.

And, it is obvious that a relation of $T_1'(\div\infty)>T_2'>T_3'$ is fulfilled similarly to the relation of $T_1>T_2>T_3$, and by appropriately selecting the resistances of the resistors 21 and 22 in FIG. 5 it is possible to realize in the second integrator circuit in FIG. 5, time constants $T_2'=T_2$ and $T_3'=T_3$ equal to the desirable values of time constants $T_2$ and $T_3$ in the second integrator circuit in FIG. 3, and yet the time constant $T_1'$ can be made infinitely large ($T_1'\div\infty$). In other words, when a human body has entered the human body sensing region 7 during a normal period, since the time constant of the second integrator circuit 13 becomes substantially infinitely large, even if a reflection amount from a human body is input to the second integrator circuit 13, the integrated value is almost not increased, and hence the sensitivity of the human body sensing apparatus would be scarcely lowered.

As will be apparent from the above description, according to the present invention, since a human body sense signal is output in response to a difference between a reflection amount from a background and a reflection amount from a human body, even if change in time of a radiation efficiency of a projector or change of conditions of a background should exist, a human body can be sensed accurately, malfunction would not occur, and even a human body standing still can be sensed.

In addition, since the human body sense signal is output when the above-mentioned difference in a reflection amount has a predetermined value or larger consecutively for a predetermined period of time, in the case where the projected infra-red rays are reflected by falling snow and enter the photo-sensor or the rays of sunlight are reflected by any moving body and enter the photo-sensor, a human body sense signal would not be output, and therefore, malfunctions would not be caused by falling snow or the rays of sunlight. In other words, the shortcomings of the method and apparatus for sensing a human body in the prior art, have been obviated.

What is claimed is:

1. An apparatus for sensing a human body comprising a projector for projecting infra-red rays towards a human body sensing region, a photo-sensor for receiving infra-red rays reflected from said human body sensing region and outputting an electrical signal corresponding to an intensity of incident infra-red rays, a first integrator circuit connected to the output side of said photo-sensor and having a relatively small time constant, a second integrator circuit connected to the output side of said photo-sensor and having a relatively large time constant, and a response circuit means connected to the outputs of said first integrator circuit and said second integrator circuit for outputting a human body sense signal when the difference between said outputs is held at a predetermined level or higher consecutively for a predetermined period of time.

2. An apparatus as claimed in claim 1, wherein said second integrator circuit includes means for shortening a time constant of the second integrator circuit for a predetermined period of time when a power Source has been switched ON or a push-button witch has been, actuated, and means for enlongating the time constant of the second integrator circuit during the period when said human body sense signal is output from said response circuit.

3. An apparatus as claimed in claim 2, wherein said second integrator circuit has a substantially infinite time constant when said time constant of second integrator circuit has been elongated.

4. An apparatus as claimed in claim 1, said response circuit means comprising a differential amplifier connected at its differential input side to output sides of said first and second integrator circuits, respectively, a comparator connected at its input side to a level setter for setting output of said differential amplifier and a predetermined level and developing its output when the output of said differential amplifier is higher than said predetermined level, a pulse width discriminator circuit connected at its input side to an output side of the comparator and developing its output when the output of said comparator is continuously developed for said predetermined period of time, and a timer connected at its input side to the output side of said pulse width discriminator circuit and applying an electric load current to a load from a time of developing the output of said pulse width discriminator circuit to a time of passing a second predetermined period of time after the output of said pulse width discriminator circuit ceases to exist.

* * * * *